United States Patent
Kramer

(10) Patent No.: US 10,827,758 B2
(45) Date of Patent: *Nov. 10, 2020

(54) RELATING TO WATER TREATMENT

(71) Applicant: BWA WATER ADDITIVES UK LIMITED, Manchester (GB)

(72) Inventor: Jeffrey Kramer, Snellville, GA (US)

(73) Assignee: ITALMATCH CHEMICALS GB LIMITED, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,693

(22) Filed: Oct. 14, 2014

(65) Prior Publication Data

US 2016/0100584 A1  Apr. 14, 2016

(51) Int. Cl.
*A01N 59/02* (2006.01)
*A01N 57/20* (2006.01)
*C02F 1/50* (2006.01)
*C02F 1/76* (2006.01)

(52) U.S. Cl.
CPC .......... *A01N 59/02* (2013.01); *A01N 57/20* (2013.01); *C02F 1/50* (2013.01); *C02F 1/766* (2013.01); *C02F 2209/05* (2013.01); *C02F 2209/10* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 3,281,365 A | 10/1966 | Moedritzer | |
| 4,835,143 A | 5/1989 | Donofrio et al. | |
| 4,874,526 A * | 10/1989 | Grade ........................ | C02F 5/14 210/697 |
| 5,063,213 A | 11/1991 | Whitekettle et al. | |
| 5,063,214 A | 11/1991 | Whitekettle et al. | |
| 5,063,218 A | 11/1991 | Whitekettle et al. | |
| 5,102,874 A | 4/1992 | Lintner et al. | |
| 5,376,731 A | 12/1994 | Kerr et al. | |
| 5,741,757 A | 4/1998 | Cooper et al. | |
| 6,241,898 B1 | 6/2001 | Wright et al. | |
| 6,419,879 B1 | 7/2002 | Cooper et al. | |
| 6,471,974 B1 | 10/2002 | Rees et al. | |
| 6,478,972 B1 * | 11/2002 | Shim ........................ | A01N 59/00 162/161 |
| 6,669,904 B1 * | 12/2003 | Yang ........................ | A01N 59/00 162/70 |
| 2005/0061753 A1 | 3/2005 | Dickinson | |
| 2006/0006121 A1 | 1/2006 | Simpson et al. | |
| 2006/0032823 A1 * | 2/2006 | Harrison .................. | A61L 2/18 210/754 |
| 2006/0113251 A1 | 6/2006 | McGuire et al. | |
| 2007/0012632 A1 | 1/2007 | Simons | |
| 2007/0102359 A1 | 5/2007 | Lombardi et al. | |
| 2009/0050320 A1 * | 2/2009 | Collins .................... | E21B 43/20 166/266 |
| 2009/0229827 A1 | 9/2009 | Bryant et al. | |
| 2010/0160449 A1 | 6/2010 | Rovison, Jr. et al. | |
| 2010/0200239 A1 | 8/2010 | Aften | |
| 2010/0226874 A1 | 9/2010 | Kramer et al. | |
| 2011/0257788 A1 | 10/2011 | Wiemers et al. | |
| 2012/0024794 A1 | 2/2012 | Fischmann | |
| 2012/0087993 A1 | 4/2012 | Martin | |
| 2012/0178722 A1 | 7/2012 | Yin | |
| 2012/0223022 A1 | 9/2012 | Hassler et al. | |
| 2012/0285693 A1 | 11/2012 | Mirakyan et al. | |
| 2014/0030306 A1 * | 1/2014 | Polizzotti ............... | A01N 63/00 424/420 |
| 2014/0166588 A1 | 6/2014 | Fischmann | |
| 2014/0194335 A1 | 7/2014 | Gu et al. | |
| 2014/0301984 A1 | 10/2014 | Corrin et al. | |
| 2015/0056648 A1 | 2/2015 | Tidwell et al. | |
| 2015/0225235 A1 | 8/2015 | McIlwaine et al. | |

FOREIGN PATENT DOCUMENTS

| | | |
|---|---|---|
| EP | 0479465 A2 | 4/1992 |
| EP | 0681995 A1 | 10/1994 |
| GB | 2354771 A | 4/2001 |
| JP | 10273408 A | 10/1998 |
| JP | 2010167320 | 5/2010 |
| WO | 9104668 A1 | 4/1991 |
| WO | 0142145 A1 | 6/2001 |
| WO | 03031347 A1 | 4/2003 |
| WO | 03073848 A1 | 12/2003 |

(Continued)

OTHER PUBLICATIONS

Giri, et al. Effluents from paper and pulp industries and their impact on soil properties and chemical composition of plants in Uttarakhand, India. Journal of Environment and Waste Management. vol. 1(1), May 2014, pp. 026-032.*
U.S. Appl. No. 14/513,735, filed Oct. 14, 2014, Kramer.
U.S. Appl. No. 14/513,768, filed Oct. 14, 2014, Kramer.
U.S. Appl. No. 14/673,419, filed Mar. 30, 2015, Kramer et al.
U.S. Appl. No. 14/840,674, filed Aug. 31, 2015, Kramer.
U.S. Appl. No. 14/870,951, filed Sep. 30, 2015, Kramer.
U.S. Appl. No. 14/872,399, filed Oct. 1, 2015, Kramer.
U.S. Appl. No. 14/874,686, filed Oct. 5, 2015, Kramer et al.
U.S. Appl. No. 14/878,240, filed Oct. 8, 2015, Kramer et al.
BWA Water Additives, "Product Label for Bellacide © 303," http://www.kellysolutions.com/erenewals/documentsubmit/KellyData%5COK%5Cpesticide%5CProduct%20Labe1%5C83451%5C83451-20%5C83451-20 Bellacide 303 6 16 2011_2_54_43_PM.pdf.

(Continued)

*Primary Examiner* — Ryan B Huang
(74) *Attorney, Agent, or Firm* — McNees Wallace & Nurick LLC

(57) ABSTRACT

The present invention relates to water treatment. In one example, there is provided a method of treating an aqueous system to inhibit growth of one or more micro-organisms therein and/or to reduce the number of live micro-organisms therein. The method includes adding treatment agents to said aqueous system, wherein said treatment agents include:
(a) a phosphonium compound; and
(b) a stabilised halogen containing composition.

26 Claims, No Drawings

(56) References Cited

FOREIGN PATENT DOCUMENTS

| WO | 2005123607 A1 | 12/2005 |
| WO | 2010100470 A2 | 9/2010 |

OTHER PUBLICATIONS

BWA Water Additives, "Product Information for Bellacide © 303—Multi-purpose Non-oxidizing Biocide for Industrial Water Systems," http://www.wateradditives.com/Repository/Files/BWA_Bellacide_303_GP_WF_-_AsiaPac_O.pdf.

BWA Water Additives, "Technical Data for Bellacide © 303—Multi-purpose Non-oxidizing Biocide for Industrial Water Systems," http://www.wateradditives.com/Repository/Files/BWA_Bellacide_303_TI_WF_AsiaPac.pdf.

Kull, F C. et al., "Mixtures of Quaternary Ammonium Compounds and Long-chain Fatty Acids as Antifungal Agents," Applied Microbiology, Nov. 1961, pp. 538-541, vol. 9, No. 6, The American Society for Microbiology by The Williams & Wilkins Company, Baltimore, MD.

May, Oscar W., "Polymeric Antimicrobial Agents," Disinfection, Sterilization, and Preservation, Chapter 18, Jan. 1, 1991, pp. 322-333, Philadelphia, Lea & Febiger, US.

Rembaum, A, "Biological Activity of Ionene Polymers," Applied Polymer Symposium, 1973, pp. 299-317, No. 22, J. Wiley & Sons, Inc., New York, NY.

U.S. Appl. No. 12/399,300, Final Office Action dated Feb. 23, 2016, 14 pages.

Kramer, Jeffrey F., et al. "A New High Performance Quaternary Phosphonium Biocide for Microbiological Control in Oilfield Water Systems", NACE International Corrosion Conference & Expo, Paper No. 08660, 2008.

Chemical Reactivity of ClO2, Chlorine Dioxide Chemistry, Scotmas, available at http://www.scotmas.com/chlorine-dioxide/chemical-reactivity-of-clo2.aspx?locale=en, Apr. 24, 2018.

"Red-Oxy: Method of Treating Oilfield Water", Water Technology & Chemicals, Technical Datasheet, 3 pages, available at https://www.watchwater.de/documents/redoxy_oilfield_water.pdf, Dec. 15, 2017.

Muyzer, et al., "The ecology and biotechnology of sulphate-reducing bacteria", Nature Reviews, Microbiology, vol. 6, pp. 441-454, Jun. 2008.

Akyon, "Biological Treatment of Hydraulic Fracturing Produced Water", University of Pittsburgh Dissertation, 2017.

Zehr, "Microbes in Earth's aqueous environments", Frontiers in Microbiology, Aquatic Microbiology, Opinion Article, vol. 1, Article 4, pp. 1-2, doi: 10.3389/fmicb.2010.00004, www.frontiersin.org, Jul. 2010.

Kim et al. "Isolation and Culture Conditions of a Klebsiella pneumoniae Strain That Can Utilize Ammonium and Nitrate Ions Simultaneously with Controlled Iron and Molybdate Ion Concentrations", Biosci. Biotechnol. Biochem., 66 (5), 996-1001, 2002.

Augustinovic et al., "Microbes—Oilfield Enemies or Allies?" Oilfield Review, Summer 2012:24, No. 2, pp. 4-17, 2012.

Braunstein et al., "Indole-positive Strains of Klebsiella pneumoniae Producing Hydrogen Sulfide in Iron—Agar Slants", downloaded from https://academic.oup.com/ajcp/article-abstract/65/5/702/1765452, Dec. 19, 2017.

Abdou, "Finding Value in Formation Water", Oilfield Review Spring 2011:23, No. 1, pp. 24-35, 2011.

World Health Organization, "Total dissolved solids in Drinking-water", Background document for development of WHO Guidelines for Drinking-water Quality, 2003.

Haller et al., "Determination of Chlorine Dioxide and Other Active Chlorine Compounds in Water", Analytical Chemistry, vol. 20, No. 7, pp. 639-642, Jul. 1948.

USPTO Non-Final Office Action for U.S. Appl. No. 14/513,693, dated Feb. 26, 2016.

McCoy, "Microbiology of Cooling Water", Chemical Publishing Co., New York, NY, pp. 76-77 (1980).

* cited by examiner

# RELATING TO WATER TREATMENT

FIELD OF THE INVENTION

The present invention relates to water treatment, particularly though not exclusively, to methods of treating aqueous systems to inhibit growth of micro-organisms.

BACKGROUND TO THE INVENTION

The presence and growth of micro-organisms in aqueous systems, especially in industrial water systems, is a concern. Examples of industrial water systems where micro-organisms are a concern include cooling water systems, pulping and papermaking systems and oil and gas field water systems.

The presence of micro-organisms in industrial water systems may result in the formation of deposits on system surfaces. These deposits or slime can give rise to various problems. In cooling water systems, slime may restrict water flow, reduce heat transfer efficiency, cause corrosion and may be aesthetically unappealing especially if algae are present due to their visible green pigmentation. Corrosion can also occur in industrial water systems in the absence of visible slime through the action of micro-organisms.

In pulp and paper mill systems, slime formed by micro-organisms may cause fouling, plugging, or corrosion of the system. The slime may also break loose and become entrained in the paper produced causing blemishes, holes, tears, and odour in the finished product. The end result may therefore be unusable product and wasted output.

Slime can also be a problem in oil and gas field water systems and may cause energy losses due to increased fluid frictional resistance, formation plugging and corrosion. The slime may harbour a mixture of aerobic and anaerobic bacteria that are responsible for the production of hydrogen sulfide gas. The hydrogen sulfide may cause souring of oil and gas which may reduce the quality of these products and increase treatment costs.

*Pseudomonas aeruginosa* bacteria are commonly present in air, water and soil. These bacteria continually contaminate open cooling water systems, pulping and papermaking systems and oil and gas field water systems and are among the most common slime formers. Slime may be viewed as being a mass of cells stuck together by the cementing action of the gelatinous secretions around each cell. The slime entraps other debris, restricts water flow and heat transfer and may serve as a site for corrosion.

*Chlorella vulgaris* algae are also commonly present in air, water and soil. These algae continually contaminate open cooling water systems and their growth turns the water and surfaces in these systems green. They also provide a food source for bacteria, which can stimulate slime formation, and protozoa which can harbour the pathogenic bacterium *Legionella pneumophila*.

A known method of controlling microbial growth in aqueous systems is to use biocides. While biocides are known to inhibit microbial growth the biocidal effect is generally of limited duration. The effectiveness of known biocides may be rapidly reduced as a result of exposure to negative influences. Negative influences may include temperature, pH or reaction with ingredients present in the system which neutralizes their biocidal effect. Therefore, the use of such biocides may involve continuous or frequent addition and their application at multiple sites or zones in the system to be treated. The cost of the biocide treatment and the labour costs associated with the application of known biocides may therefore be significant.

Known biocides are also highly toxic in the quantities known to be required for effective control of microbial populations. As a result, the amount of biocides that can be safely discharged into the environment may be limited by environmental regulations. Therefore, the need exists for improved methods for controlling microbial growth in aqueous systems.

As noted above, known biocides have a number of limitations including the large quantities of biocides which typically have to be used to achieve the desired biocidal effect and the potential harmful effects on the environment of biocides and therefore reducing the amount necessary for control and thus the quantity released to the environment has many benefits.

Accordingly, the present invention aims to address at least one disadvantage associated with the prior art whether discussed herein or otherwise.

SUMMARY OF THE INVENTION

According to the present invention there is provided a method of treating an aqueous system as set forth in the appended claims. Other features of the invention will be apparent from the claims, and the description which follows.

According to a first aspect of the present invention there is provided a method of treating an aqueous system to inhibit growth of one or more micro-organisms therein and/or to reduce the number of live micro-organisms therein, wherein the method comprises adding treatment agents to said aqueous system and wherein said treatment agents comprise:

(a) a phosphonium compound; and
(b) a stabilised halogen containing composition.

The stabilised halogen containing composition (b) may comprise a stabiliser (c) and a halogen containing compound (d). Alternatively, or in addition, the stabilised halogen containing composition (b) may comprise a stabilised halogen containing compound (e).

Suitably, the stabilised halogen containing composition (b) comprises a bromine containing composition. The stabilised halogen containing composition (b) may comprise a bromide, for example sodium bromide. The stabilised halogen containing composition (b) may comprise sulfamate stabilised halogen, for example sulfamate stabilised bromine. The stabilised halogen containing composition (b) may comprise bromosulfamate.

The stabilised halogen containing composition (b) may comprise a nitrogen and sulfur based acid and/or salt thereof. The stabilised halogen containing composition (b) may comprise sulfamic acid and/or salt thereof. The stabilised halogen containing composition may comprise trichloroisocyanuric acid and/or a salt thereof. The stabilised halogen containing composition may comprise hypobromous acid and/or a salt thereof.

The halogen containing compound (d) may comprise a bromine containing compound. The halogen containing compound (d) may comprise a bromide, for example sodium bromide.

Suitably, the stabiliser (c) comprises an acid, for example sulfamic acid.

Suitably, the stabilised halogen containing compound (e) comprises a bromine containing compound. Suitably, the stabilised halogen containing compound (e) comprises a sulfamate. Suitably, the stabilised halogen containing compound (e) comprises a bromosulfamate.

Suitably, the method comprises adding to an aqueous system a stabilised halogen containing composition (b) which comprises a composition formed from sodium bromide which has been oxidized by solid trichloroisocyanuric acid to give hypobromous acid with the hypobromous acid having been stabilised using sulfamic acid to provide bromosulfamate.

Suitably, the stabilised halogen containing composition (b) has an activity of at least 1% as chlorine, for example at least: 2%; 3%; 4%; 5%; 6%; 7%; 8%; 9% or 10%. The stabilised halogen containing composition (b) may have an activity of less than 20% as chlorine, for example less than: 19%; 18%; 17%; 16%; or 15%. The stabilised halogen containing composition (b) may have an activity of from 3% to 15% as chlorine, for example from 6% to 11%.

Suitably, the method comprises treating an aqueous system to inhibit growth of anaerobic bacteria and/or to reduce the number of live anaerobic bacteria therein. Suitably, the method comprises treating an aqueous system to inhibit growth of facultative anaerobic bacteria and/or to reduce the number of live facultative anaerobic bacteria therein. Suitably, the method comprises treating an aqueous system to inhibit growth of aerobic bacteria and/or to reduce the number of live aerobic bacteria therein.

Suitably the aqueous system comprises a mixture of water and other constituents. The aqueous system may contain oil. The aqueous system may comprise an oil and water emulsion. The aqueous system may comprise solids. The aqueous system may comprise suspended solids. The aqueous system may comprise high levels of dissolved solids. The aqueous system may comprise one or more salts, for example sodium chloride.

Suitably, the method comprises treating an aqueous system which comprises dissolved solids.

Suitably, the method comprises treating an aqueous system having a total dissolved solids (TDS) of 1000 mg $l^{-1}$ or greater. Suitably, the aqueous system has a total dissolved solids (TDS) of at least 2000 mg $l^{-1}$, for example at least: 3000 mg $l^{-1}$; 4000 mg $l^{-1}$; 5000 mg $l^{-1}$; 6000 mg $l^{-1}$; 7000 mg $l^{-1}$; 8000 mg $l^{-1}$; or 9000 mg $l^{-1}$.

Suitably, the method comprises treating an aqueous system having a total dissolved solids (TDS) of 10,000 mg $l^{-1}$ or greater. Suitably, the aqueous system has a total dissolved solids (TDS) of at least 11,000 mg $l^{-1}$, for example at least: 12,000 mg $l^{-1}$; 13,000 mg $l^{-1}$; 14,000 mg $l^{-1}$; 15,000 mg $l^{-1}$; 16,000 mg $l^{-1}$; 17,000 mg $l^{-1}$; 18,000 mg $l^{-1}$; or 19,000 mg $l^{-1}$.

Suitably, the method comprises treating an aqueous system having a total dissolved solids (TDS) of 20,000 mg $l^{-1}$ or greater. Suitably, the aqueous system has a total dissolved solids (TDS) of at least 21,000 mg $l^{-1}$, for example at least: 22,000 mg $l^{-1}$; 23,000 mg $l^{-1}$; 24,000 mg $l^{-1}$; 25,000 mg $l^{-1}$; 26,000 mg $l^{-1}$; 27,000 mg $l^{-1}$; 28,000 mg $l^{-1}$; or 29,000 mg $l^{-1}$.

Suitably, the method comprises treating an aqueous system having a total dissolved solids (TDS) of 30,000 mg $l^{-1}$ or greater. Suitably, the aqueous system has a total dissolved solids (TDS) of at least 31,000 mg $l^{-1}$, for example at least: 32,000 mg $l^{-1}$; for example at least: 33,000 mg $l^{-1}$; 34,000 mg $l^{-1}$; 35,000 mg $l^{-1}$; 36,000 mg $l^{-1}$; 37,000 mg $l^{-1}$; 38,000 mg $l^{-1}$; 39,000 mg $l^{-1}$; or 40,000 mg $l^{-1}$.

The method may comprise treating an aqueous system having a total dissolved solids (TDS) of 50,000 mg $l^{-1}$ or greater. The aqueous system may have a total dissolved solids (TDS) of at least 60,000 mg $l^{-1}$, for example at least: 70,000 mg $l^{-1}$; 80,000 mg $l^{-1}$; 90,000 mg $l^{-1}$; 100,000 mg $l^{-1}$; 110,000 mg $l^{-1}$; 120,000 mg $l^{-1}$; 130,000 mg $l^{-1}$; 140,000 mg $l^{-1}$; 150,000 mg $l^{-1}$; 160,000 mg $l^{-1}$; 170,000 mg $l^{-1}$; 180,000 mg $l^{-1}$; 190,000 mg $l^{-1}$; 200,000 mg $l^{-1}$; 210,000 mg $l^{-1}$; 220,000 mg $l^{-1}$; 230,000 mg $l^{-1}$; 240,000 mg $l^{-1}$; or 250,000 mg $l^{-1}$.

Suitably, the method comprises treating an aqueous system having a total dissolved solids (TDS) of 250,000 mg $l^{-1}$ or less. The aqueous system may have a total dissolved solids (TDS) of no more than 240,000 mg $l^{-1}$, for example no more than 230,000 mg $l^{-1}$; 220,000 mg $l^{-1}$; 210,000 mg $l^{-1}$; 200,000 mg $l^{-1}$; 190,000 mg $l^{-1}$; 180,000 mg $l^{-1}$; 170,000 mg $l^{-1}$; 160,000 mg $l^{-1}$; 150,000 mg $l^{-1}$; 140,000 mg $l^{-1}$; 130,000 mg $l^{-1}$; 120,000 mg $l^{-1}$; or 110,000 mg $l^{-1}$.

Suitably, the method comprises treating an aqueous system having a total dissolved solids (TDS) of 100,000 mg $l^{-1}$ or less. The aqueous system may have a total dissolved solids (TDS) of no more than 90,000 mg $l^{-1}$, for example no more than 80,000 mg $l^{-1}$; 70,000 mg $l^{-1}$; 60,000 mg $l^{-1}$; 50,000 mg $l^{-1}$; or 40,000 mg $l^{-1}$.

Suitably, the method comprises treating an aqueous system having a total dissolved solids (TDS) of from 10,000 mg $l^{-1}$ to 250,000 mg $l^{-1}$. Suitably, the method comprises treating an aqueous system having a total dissolved solids (TDS) of from 10,000 mg $l^{-1}$ to 100,000 mg $l^{-1}$. Suitably, the aqueous system has a total dissolved solids (TDS) of from 20,000 mg $l^{-1}$ to 100,000 mg $l^{-1}$, for example from 25,000 mg $l^{-1}$ to 100,000 mg $l^{-1}$. Suitably, the aqueous system has a total dissolved solids (TDS) of from 30,000 mg $l^{-1}$ to 100,000 mg $l^{-1}$. Suitably, the method comprises treating an aqueous system having a total dissolved solids (TDS) of from 20,000 mg $l^{-1}$ to 80,000 mg $l^{-1}$, for example from 25,000 mg $l^{-1}$ to 80,000 mg $l^{-1}$. Suitably, the method comprises treating an aqueous system having a total dissolved solids (TDS) of from 30,000 mg $l^{-1}$ to 80,000 mg $l^{-1}$.

Suitably, the method comprises treating an aqueous system to inhibit the growth of a plurality of different micro-organisms.

Suitably, the method comprises treating an aqueous system to prevent the growth of one or more micro-organisms. Suitably, the method comprises treating an aqueous system to prevent the growth of a plurality of different micro-organisms.

Suitably, the method comprises treating an aqueous system to kill one or more micro-organisms. Suitably, the method comprises treating an aqueous system to kill a plurality of different micro-organisms.

Suitably, the method comprises treating an aqueous system to inhibit or prevent the growth of one or more micro-organisms therein and/or to reduce the number of live micro-organisms therein, wherein said micro-organisms are selected from bacteria, fungi and algae. Suitably, the method comprises a method of inhibiting growth of bacteria and/or killing bacteria. Suitably, the method comprises a method of inhibiting growth of fungi and/or killing fungi. Suitably, the method comprises a method of inhibiting growth of algae and/or killing algae.

Suitably, the method comprises treating an aqueous system to inhibit or prevent the growth of anaerobic micro-organisms. Suitably, the method comprises treating an aqueous system to kill anaerobic micro-organisms. Suitably, the method comprises treating an aqueous system to inhibit or prevent the growth of anaerobic bacteria. Suitably, the method comprises treating an aqueous system to kill anaerobic bacteria. Suitably, the method comprises treating an aqueous system to inhibit or prevent the growth of facultative anaerobic bacteria. Suitably, the method comprises treating an aqueous system to kill facultative anaerobic bacteria.

Suitably, the method comprises treating an aqueous system to inhibit or prevent the growth of aerobic micro-organisms. Suitably, the method comprises treating an aqueous system to kill aerobic micro-organisms. Suitably, the method comprises treating an aqueous system to inhibit or prevent the growth of aerobic bacteria. Suitably, the method comprises treating an aqueous system to kill aerobic bacteria.

Suitably, the method comprises treating an aqueous system to inhibit or prevent the growth of anaerobic and aerobic micro-organisms. Suitably, the method comprises treating an aqueous system to kill anaerobic and aerobic micro-organisms. Suitably, the method comprises treating an aqueous system to inhibit or prevent the growth of anaerobic and aerobic bacteria. Suitably, the method comprises treating an aqueous system to kill anaerobic and aerobic bacteria.

The method may comprise a method of inhibiting growth of gram-positive aerobic bacteria, gram-positive facultative anaerobic bacteria, gram-negative aerobic bacteria, gram-negative facultative anaerobic bacteria, gram-positive anaerobic bacteria and/or gram-negative anaerobic bacteria. The method may comprise a method of inhibiting growth of mold and/or yeast. The method may comprise a method of inhibiting the growth of blue green algae and/or green algae. Suitably, the method comprises a method of inhibiting the growth of gram-negative aerobic bacteria, gram-negative facultative anaerobic bacteria, gram-negative anaerobic bacteria, and green algae. Suitably, the method comprises inhibiting the growth of *Pseudomonas aeruginosa* bacteria in an aqueous system. Suitably, the method comprises inhibiting the growth of *Enterobacter aerogenes* bacteria in an aqueous system. Suitably, the method comprises inhibiting the growth of *Desulfovibrio vulgaris* bacteria in an aqueous system. Suitably, the method comprises inhibiting the growth of *Chlorella vulgaris* algae in an aqueous system.

Suitably, the method comprises adding a phosphonium compound treatment agent and a stabilised halogen containing composition treatment agent to an aqueous system such that a Log 10 reduction of 1 or greater in an anaerobe culture is obtained after a contact time of 1 hour. Suitably, the method comprises obtaining a Log 10 reduction of 2 or greater to an anaerobe culture after a contact time of 1 hour; for example of 3 or greater; 4 or greater; 5 or greater; or 6 or greater.

Suitably, the method comprises adding a phosphonium compound, and a stabilised halogen containing composition to an aqueous system such that a complete kill of an anaerobe culture is obtained after a contact time of 1 hour.

Suitably, the method comprises obtaining a Log 10 reduction of 1 or greater to an anaerobe culture after a contact time of 24 hours. Suitably, the method comprises obtaining a Log 10 reduction of 2 or greater to an anaerobe culture after a contact time of 24 hours; for example of 3 or greater; 4 or greater; 5 or greater; or 6 or greater.

Suitably, the method comprises adding a phosphonium compound and a stabilised halogen containing composition to an aqueous system such that a complete kill of an anaerobe culture is obtained after a contact time of 24 hours.

Suitably, the method comprises adding a phosphonium compound and a stabilised halogen containing composition to an aqueous system such that a Log 10 reduction of 1 or greater in a facultative anaerobe culture is obtained after a contact time of 24 hours. Suitably, the method comprises obtaining a Log 10 reduction of 2 or greater to a facultative anaerobe culture after a contact time of 24 hours; for example of 3 or greater; 4 or greater; 5 or greater; 6 or greater; 7 or greater; or 8 or greater.

Suitably, the method comprises adding a phosphonium compound and a stabilised halogen containing composition to an aqueous system such that a complete kill of a facultative anaerobe culture is obtained after a contact time of 24 hours.

Suitably, the stabilised halogen containing composition (b) comprises a composition comprising a halogen containing compound (d) and/or a stabilised halogen containing compound (e) and the method comprises adding compound (a) and composition (b) to the aqueous system such that compound (a) and compound (d) and/or compound (e) are added to the aqueous system in a total amount of from 0.1 to 1000 parts by weight per one million parts by weight of said aqueous system (ppm), for example from 0.1 to 100 ppm.

As used herein, all references to ppm refer to parts per million by weight unless stated otherwise.

Suitably, the stabilised halogen containing composition (b) comprises a composition comprising a halogen containing compound (d) and/or a stabilised halogen containing compound (e) and the method comprises adding compound (a) and composition (b) to the aqueous system such that compound (a) and compound(s) (d)/(e) are present in the aqueous system in a total amount of from 0.1 to 1000 parts by weight per one million parts by weight of said aqueous system (ppm), for example from 0.1 to 100 ppm.

The method may comprise adding compound (a) and compound(s) (d)/(e) to the aqueous system such that they are added in a total amount of from 0.5 to 100 ppm. The method may comprise adding compound (a) and compound(s) (d)/(e) to the aqueous system such that they are added in a total amount of from 0.5 to 70 ppm. Suitably, the method comprises adding compound (a) and compound(s) (d)/(e) to the aqueous system such that they are added in a total amount of from 1 to 60 ppm. Suitably, the method comprises adding compound (a) and compound(s) (d)/(e) to the aqueous system such that they are added in a total amount of from 1 to 50 ppm. Suitably, the method comprises adding compound (a) and compound(s) (d)/(e) to the aqueous system such that they are added in a total amount of from 1 to 40 ppm. Suitably, the method comprises adding compound (a) and compound(s) (d)/(e) to the aqueous system such that they are added in a total amount of from 1 to 30 ppm, for example 1 to 20 ppm.

Suitably, the method comprises adding a stabilised halogen containing composition (b) to an aqueous system in an amount of at least 10 ppm.

Suitably, the method comprises adding a stabilised halogen containing composition (b) comprising water and a halogen containing compound (d) and/or a stabilised halogen containing compound (e) to an aqueous system in an amount of at least 10 ppm, calculated based on the total amount of composition (b) added, Suitably, the method comprises adding a stabilised halogen containing composition (b) comprising water and sodium bromide and/or bromosulfamate to an aqueous system in an amount of at least 10 ppm, calculated based on the total amount of composition (b) added, The method suitably comprises adding BromMax 7.1 available from Enviro Tech Chemical Services, Inc. as the stabilised halogen containing composition (b) and the method suitably comprises adding BromMax 7.1 to an aqueous composition in an amount of at least 10 ppm.

Suitably, the method comprises adding a stabilised halogen containing composition (b) to an aqueous system in an amount of at least 10 ppm, for example at least 15 ppm; 20 ppm; 25 ppm; 30 ppm; 35 ppm; 40 ppm; or 45 ppm.

Suitably, the method comprises adding a stabilised halogen containing composition (b) to an aqueous system in an amount of at least 50 ppm, for example, at least: 55 ppm; 60 ppm; 65 ppm; 70 ppm; 75 ppm; 80 ppm; 85 ppm; 90 ppm; 95 ppm 100 ppm; 105 ppm; 110 ppm; 115 ppm; 120 ppm; 125 ppm; or 130 ppm. The method may comprise adding halogen containing composition (b) to an aqueous system in an amount of at least 140 ppm, for example, at least: 150 ppm; 160 ppm; 170 ppm; 180 ppm; 190 ppm; 200 ppm; 210 ppm; 220 ppm; 230 ppm; 240 ppm; 250 ppm; 260 ppm; 270 ppm; 280 ppm; 290 ppm; 300 ppm; 310 ppm; or 320 ppm.

Suitably, the method comprises adding a stabilised halogen containing composition (b) comprising sodium bromide and/or bromosulfamate to an aqueous system such that said composition (b) is added in an amount of at least 10 ppm, for example at least 15 ppm; 20 ppm; 25 ppm; 30 ppm; 35 ppm; 40 ppm; or 45 ppm. Suitably, the method comprises adding a stabilised halogen containing composition (b) comprising sodium bromide and/or bromosulfamate to an aqueous system such that said composition (b) is added to an aqueous system in an amount of at least 50 ppm, for example, at least: 55 ppm; 60 ppm; 65 ppm; 70 ppm; 75 ppm; 80 ppm; 85 ppm; 90 ppm; 95 ppm 100 ppm; 105 ppm; 110 ppm; 115 ppm; 120 ppm; 125 ppm; or 130 ppm. The method may comprise adding halogen containing composition (b) comprising sodium bromide and/or bromosulfamate to an aqueous system such that said composition (b) is added to an aqueous system in an amount of at least 140 ppm, for example, at least: 150 ppm; 160 ppm; 170 ppm; 180 ppm; 190 ppm; 200 ppm; 210 ppm; 220 ppm; 230 ppm; 240 ppm; 250 ppm; 260 ppm; 270 ppm; 280 ppm; 290 ppm; 300 ppm; 310 ppm; or 320 ppm.

Suitably, the method comprises adding a stabilised halogen containing composition (b) to an aqueous system in an amount of not more than 1000 ppm, for example not more than 500 ppm. Suitably, the method comprises adding a stabilised halogen containing composition (b) to an aqueous system in an amount of not more than 400 ppm, for example not more than: 450 ppm; 400 ppm; 350 ppm; 300 ppm; 250 ppm; 200 ppm or 150 ppm.

Suitably, the method comprises adding a phosphonium compound treatment agent to an aqueous system in an amount of at least 0.1 parts per million (ppm).

Suitably, the method comprises adding a phosphonium compound treatment agent to an aqueous system to provide a treated aqueous system comprising said phosphonium compound in an amount of at least 0.1 parts per million (ppm).

Suitably, the method comprises adding a phosphonium compound to an aqueous system such that it is added in an amount of at least 0.2 ppm. Suitably, the method comprises adding a phosphonium compound to an aqueous system such that it is added in an amount of at least 0.3 ppm, for example at least: 0.4 ppm; 0.5 ppm; 0.6 ppm; 0.7 ppm; 0.8 ppm; 0.9 ppm; or 1.0 ppm. Suitably, the method comprises adding a phosphonium compound to an aqueous system such that it is added in an amount of at least 1 ppm; for example at least 1.5 ppm; 2.0 ppm; 2.5 ppm; 3.0 ppm; 3.5 ppm; 4.0 ppm; 4.5 ppm; 5.0 ppm; 5.5 ppm; or 6.0 ppm. The method may comprise adding a phosphonium compound to an aqueous system such that it is added in an amount of at least 6 ppm, for example at least: 7 ppm; 8 ppm; 9 ppm; 10 ppm; 11 ppm; 12 ppm. The method may comprise adding a phosphonium compound to an aqueous system such that it is added in an amount of at least 13 ppm; for example at least: 14 ppm; 15 ppm; 16 ppm; 17 ppm; 18 ppm; 19 ppm; 20 ppm; 21 ppm; 22 ppm; 23 ppm; 24 ppm or 25 ppm.

Suitably, the method comprises adding a phosphonium compound to an aqueous system such that it is present in an amount of at least 0.2 ppm. Suitably, the method comprises adding a phosphonium compound to an aqueous system such that it is present in an amount of at least 0.3 ppm, for example at least: 0.4 ppm; 0.5 ppm; 0.6 ppm; 0.7 ppm; 0.8 ppm; 0.9 ppm; or 1.0 ppm. Suitably, the method comprises adding a phosphonium compound to an aqueous system such that it is present in an amount of at least 1 ppm; for example at least 1.5 ppm; 2.0 ppm; 2.5 ppm; 3.0 ppm; 3.5 ppm; 4.0 ppm; 4.5 ppm; 5.0 ppm; 5.5 ppm; or 6.0 ppm. The method may comprise adding a phosphonium compound to an aqueous system such that it is present in an amount of at least 6 ppm, for example at least: 7 ppm; 8 ppm; 9 ppm; 10 ppm; 11 ppm; 12 ppm. The method may comprise adding a phosphonium compound to an aqueous system such that it is present in an amount of at least 13 ppm; for example at least: 14 ppm; 15 ppm; 16 ppm; 17 ppm; 18 ppm; 19 ppm; 20 ppm; 21 ppm; 22 ppm; 23 ppm; 24 ppm or 25 ppm.

Suitably, the method comprises adding a phosphonium compound treatment agent to an aqueous system to provide a treated aqueous system comprising said phosphonium compound added in an amount of 1.0 to 50 ppm, for example 1.0 to 20 ppm, for example 1.0 to 15.0 ppm. Suitably, the method comprises adding a phosphonium compound treatment agent to an aqueous system to provide a treated aqueous system comprising said phosphonium compound added in an amount of 1 to 5 ppm, for example 2 to 4 ppm. Suitably, the method comprises adding a phosphonium compound treatment agent to an aqueous system to provide a treated aqueous system comprising said phosphonium compound added in an amount of 3 to 10 ppm, for example 5 to 7 ppm. Suitably, the method comprises adding a phosphonium compound treatment agent to an aqueous system to provide a treated aqueous system comprising said phosphonium compound added in an amount of 10 to 15 ppm, for example 12.0 to 13.0 ppm.

Suitably, the method comprises adding a phosphonium compound treatment agent to an aqueous system in an amount of not more than 100 ppm, for example not more than 70 ppm.

Suitably, the method comprises adding a phosphonium compound treatment agent to an aqueous system to provide a treated aqueous system comprising said phosphonium compound in an amount of not more than 100 ppm, for example not more than 70 ppm.

Suitably, the method comprises adding a phosphonium compound to an aqueous system such that it is added in an amount of not more than 100 ppm, for example not more than 90 ppm; 80 ppm or 70 ppm. Suitably, the method comprises adding a phosphonium compound to an aqueous system such that it is added in an amount of not more than 65 ppm, for example not more than 60 ppm; 55 ppm; or 50 ppm. The method may comprise adding a phosphonium compound to an aqueous system such that it is added in an amount of not more than 50 ppm, for example not more than 45 ppm; 40 ppm; or 35 ppm. The method may comprise adding a phosphonium compound to an aqueous system such that it is added in an amount of not more than 30 ppm, for example not more than; 25 ppm; 20 ppm; 15 ppm; 10 ppm or 5 ppm.

Suitably, the method comprises adding a phosphonium compound to an aqueous system such that it is present in an amount of not more than 100 ppm, for example not more than 90 ppm; 80 ppm or 70 ppm. Suitably, the method comprises adding a phosphonium compound to an aqueous system such that it is present in an amount of not more than 65 ppm, for example not more than 60 ppm; 55 ppm; or 50 ppm. The method may comprise adding a phosphonium compound to an aqueous system such that it is present in an amount of not more than 50 ppm, for example not more than 45 ppm; 40 ppm; or 35 ppm. The method may comprise adding a phosphonium compound to an aqueous system such that it is present in an amount of not more than 30 ppm, for example not more than; 25 ppm; 20 ppm; 15 ppm; 10 ppm; or 5 ppm.

Suitably, the method comprises adding a stabilised halogen containing composition (b) to an aqueous system, wherein the composition (b) comprises a halogen containing compound (d) and/or a stabilised halogen containing compound (e) and wherein the method comprises adding the composition (b) such that said halogen containing compound (d) and/or said stabilised halogen containing compound (e) are added in a total amount of at least 0.1 parts per million (ppm).

Suitably, the method comprises adding a stabilised halogen containing composition (b) to an aqueous system, wherein the composition (b) comprises a halogen containing compound (d) and/or a stabilised halogen containing compound (e) and wherein the method comprises adding the composition (b) to provide a treated aqueous system comprising said halogen containing compound (d) and/or said stabilised halogen containing compound (e) in a total amount of at least 0.1 parts per million (ppm).

The method may comprise adding a bromide compound to an aqueous system in an amount of at least 0.1 parts per million (ppm). The method may comprise adding sodium bromide to an aqueous system in an amount of at least 0.1 parts per million (ppm).

Suitably, the method comprises adding a bromide compound to an aqueous system to provide a treated aqueous system comprising said bromide compound in an amount of at least 0.1 parts per million (ppm). The method may comprise adding sodium bromide to an aqueous system to provide a treated aqueous system comprising sodium bromide in an amount of at least 0.1 parts per million (ppm).

The method may comprise adding a halosulfamate compound to an aqueous system in an amount of at least 0.1 parts per million (ppm). The method may comprise adding bromosulfamate to an aqueous system in an amount of at least 0.1 parts per million (ppm).

Suitably, the method comprises adding a halosulfamate compound to an aqueous system to provide a treated aqueous system comprising said a halosulfamate compound in an amount of at least 0.1 parts per million (ppm). The method comprises adding bromosulfamate to an aqueous system to provide a treated aqueous system comprising bromosulfamate in an amount of at least 0.1 parts per million (ppm).

Suitably, the method comprises adding a halogen containing compound (d) and/or stabilised halogen containing compound (e) to an aqueous system in a total amount of at least 0.2 ppm. Suitably, the method comprises adding compound (d) and/or compound (e) to an aqueous system such that they are added in a total amount of at least 0.3 ppm, for example at least: 0.4 ppm; 0.5 ppm; 0.6 ppm; 0.7 ppm; 0.8 ppm; 0.9 ppm; or 1.0 ppm. The method may comprise adding compound (d) and/or compound (e) to an aqueous system such that they are added in a total amount of at least 1.1 ppm; for example, at least: 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding compound (d) and/or compound (e) to an aqueous system such that they are added in a total amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

Suitably, the method comprises adding a halogen containing compound (d) and/or stabilised halogen containing compound (e) to an aqueous system such that they are present in a total amount of at least 0.2 ppm. Suitably, the method comprises adding compound (d) and/or compound (e) to an aqueous system such that they are present in a total amount of at least 0.3 ppm, for example at least: 0.4 ppm; 0.5 ppm; 0.6 ppm; 0.7 ppm; 0.8 ppm; 0.9 ppm; or 1.0 ppm. The method may comprise adding compound (d) and/or compound (e) to an aqueous system such that they are present in a total amount of at least 1.1 ppm; for example, at least: 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding compound (d) and/or compound (e) to an aqueous system such that they are present in a total amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

Suitably, the method comprises adding bromosulfamate to an aqueous system such that it is added in an amount of at least 0.3 ppm, for example at least: 0.4 ppm; 0.5 ppm; 0.6 ppm; 0.7 ppm; 0.8 ppm; 0.9 ppm; or 1.0 ppm. The method may comprise adding bromosulfamate to an aqueous system such that it is added in an amount of at least 1.1 ppm; for example, at least: 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding bromosulfamate to an aqueous system such that it is added in an amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

Suitably, the method comprises adding bromosulfamate to an aqueous system such that it is present in an amount of at least 0.3 ppm, for example at least: 0.4 ppm; 0.5 ppm; 0.6 ppm; 0.7 ppm; 0.8 ppm; 0.9 ppm; or 1.0 ppm. The method may comprise adding bromosulfamate to an aqueous system such that it is present in an amount of at least 1.1 ppm; for example, at least: 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding bromosulfamate to an aqueous system such that it is present in an amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

The method may comprise adding a bromide to an aqueous system such that it is added in an amount of at least 0.2 ppm. The method may comprise adding a bromide to an aqueous system such that it is added in an amount of at least 0.3 ppm, for example at least: 0.4 ppm; 0.5 ppm; 0.6 ppm; 0.7 ppm; 0.8 ppm; 0.9 ppm; or 1.0 ppm. The method may comprise adding a bromide to an aqueous system such that it is added in an amount of at least 1.1 ppm; for example, at least: 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding a bromide to an aqueous system such that it is added in an amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

The method may comprise adding a bromide to an aqueous system such that it is present in an amount of at least 0.2 ppm. The method may comprise adding a bromide to an aqueous system such that it is present in an amount of at least 0.3 ppm, for example at least: 0.4 ppm; 0.5 ppm; 0.6 ppm; 0.7 ppm; 0.8 ppm; 0.9 ppm; or 1.0 ppm. The method may comprise adding a bromide to an aqueous system such that it is present in an amount of at least 1.1 ppm; for example, at least: 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding a bromide to an aqueous system such that it is present in an amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

The method may comprise adding a stabiliser (c) to an aqueous system in an amount of at least 0.1 parts per million (ppm).

The method may comprise adding a stabiliser to an aqueous system to provide a treated aqueous system comprising said stabiliser in an amount of at least 0.1 parts per million (ppm).

The method may comprise adding a stabiliser to an aqueous system such that it is added in an amount of at least 0.2 ppm. The method may comprise adding a stabiliser to an aqueous system such that it is added in an amount of at least 0.3 ppm, for example at least: 0.4 ppm; 0.5 ppm; 0.6 ppm; 0.7 ppm; 0.8 ppm; 0.9 ppm; or 1.0 ppm. The method may comprise adding a stabiliser to an aqueous system such that it is added in an amount of at least 1.1 ppm; for example, at least: 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding a stabiliser compound to an aqueous system such that it is added in an amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

The method may comprise adding a stabiliser to an aqueous system such that it is present in an amount of at least 0.2 ppm. The method may comprise adding a stabiliser to an aqueous system such that it is present in an amount of at least 0.3 ppm, for example at least: 0.4 ppm; 0.5 ppm; 0.6 ppm; 0.7 ppm; 0.8 ppm; 0.9 ppm; or 1.0 ppm. The method may comprise adding a stabiliser to an aqueous system such that it is present in an amount of at least 1.1 ppm; for example, at least: 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding a stabiliser compound to an aqueous system such that it is present in an amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

The method may comprise adding a bromosulfamate to an aqueous system in an amount of not more than 100 ppm, for example not more than 50 ppm The method may comprise adding a bromosulfamate to an aqueous system in an amount of not more than 20 ppm. The method may comprise adding bromosulfamate to an aqueous system in an amount of not more than 15 ppm, for example not more than 10 ppm; 9 ppm; 8 ppm; 7 ppm; or 6 ppm. Suitably, the method comprises adding bromosulfamate to an aqueous system in an amount of not more than 5.0 ppm; 4.5 ppm; 4.0 ppm; 3.5 ppm; or 3.0 ppm.

The method may comprise adding a bromosulfamate to an aqueous system to provide a treated aqueous system comprising said bromosulfamate in an amount of 0.1 to 100 ppm, suitably 0.5 to 50 ppm. The method may comprise adding bromosulfamate to an aqueous system to provide a treated aqueous system comprising said bromosulfamate in an amount of 0.5 to 5 ppm. The method may comprise adding a bromosulfamate to an aqueous system to provide a treated aqueous system comprising said bromosulfamate in an amount of 0.5 to 3.5 ppm.

The method may comprise adding a bromide to an aqueous system in an amount of not more than 100 ppm, for example not more than 50 ppm. The method may comprise adding a bromide to an aqueous system in an amount of not more than 20 ppm. The method may comprise adding a bromide to an aqueous system in an amount of not more than 15 ppm, for example not more than 10 ppm; 9 ppm; 8 ppm; 7 ppm; or 6 ppm. Suitably, the method comprises adding a bromide to an aqueous system in an amount of not more than 5.0 ppm; 4.5 ppm; 4.0 ppm; 3.5 ppm; or 3.0 ppm.

The method may comprise adding a bromide to an aqueous system to provide a treated aqueous system comprising said bromide in an amount of 0.5 to 5 ppm. The method may comprise adding a bromide to an aqueous system to provide a treated aqueous system comprising said bromide in an amount of 0.5 to 3.5 ppm.

The method may comprise adding a stabiliser (c) to an aqueous system in an amount of 0.5 to 5 ppm. The method may comprise adding a stabiliser to an aqueous system in an amount of 0.5 to 3.5 ppm.

The method may comprise adding a stabiliser (c) to an aqueous system to provide a treated aqueous system comprising said stabiliser in an amount of 0.5 to 5 ppm. The method may comprise adding a stabiliser to an aqueous system to provide a treated aqueous system comprising said stabiliser in an amount of 0.5 to 3.5 ppm.

Suitably, the method comprises adding a phosphonium compound (a) and a stabilised halogen containing composition (b) to an aqueous system in a weight ratio, expressed as active compound and composition, respectively, of phosphonium compound:stabilised halogen containing composition of from 1.0:0.5 to 1.0:100.0, for example from 1.0:5.0 to 1.0 to 50.0.

As used herein, all ratios are weight ratios unless stated otherwise.

Suitably the method comprises adding a phosphonium compound (a) and a stabilised halogen containing composition (b) to an aqueous system to provide a treated aqueous system comprising said phosphonium compound (a) and said stabilised halogen containing composition (b) in a weight ratio, expressed as active compound and composition, respectively, of phosphonium compound:stabilised halogen containing composition of from 1.0:0.5 to 1.0: 100.0, for example from 1.0:5.0 to 1.0 to 50.0.

Suitably the method comprises adding a phosphonium compound (a) and a stabilised halogen containing composition (b) to an aqueous system to provide a treated aqueous system comprising said phosphonium compound (a) and said stabilised halogen containing composition (b) in a weight ratio, expressed as active compound and composition, respectively, of phosphonium compound:stabilised halogen containing composition of at least 1.0:100.0, for example of at least: 1.0:50.0.

Suitably the method comprises adding a phosphonium compound (a) and a stabilised halogen containing composition (b) to an aqueous system to provide a treated aqueous system comprising said phosphonium compound (a) and said stabilised halogen containing composition (b) in a weight ratio, expressed as active compound and composition, respectively, of phosphonium compound:stabilised halogen containing composition of no greater than 1.0:0.5, for example no greater than 1.0:5.0.

The method may comprise adding a combination of phosphonium compounds (a) to an aqueous system. Suitably, the method comprises adding a single type of phosphonium compound (a) to an aqueous system.

Suitably, the method employs a phosphonium compound (a) having formula:

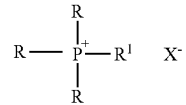

wherein each R is independently a $C_1$-$C_6$ alkyl group which is unsubstituted or substituted by a cyano, hydroxyl, esterified hydroxyl or aryl group;

$R^1$ represents a $C_8$-$C_{18}$ alkyl group which is substituted or unsubstituted; and X represents either chlorine or bromine.

Suitably, each R is a $C_1$-$C_6$ alkyl group. Suitably, each R is a $C_3$-$C_5$ alkyl group. Suitably each R is a butyl group.

Suitably $R^1$ represents a $C_8$-$C_{18}$ alkyl group. Suitably, R1 is a $C_{12}$-$C_{16}$ alkyl group. Suitably, $R^1$ is a tetradecyl group.

Suitably, X is chlorine.

Suitably, the method employs a phosphonium compound (a) which is a phosphonium chloride.

Suitably, the method comprises treating an aqueous system such that phosphonium chloride comprises greater than 50% of the total phosphonium compound(s) added to the aqueous system. Suitably, the method comprises treating an aqueous system such that phosphonium chloride comprises greater than 90% of the total phosphonium compound(s) added to the aqueous system, for example 99% or greater.

Suitably, the method comprises treating an aqueous system such that phosphonium chloride comprises greater than 50% of the total phosphonium compound(s) present in the aqueous system. Suitably, the method comprises treating an aqueous system such that phosphonium chloride comprises greater than 90% of the total phosphonium compound(s) present in the aqueous system, for example 99% or greater.

Suitably, the method employs a phosphonium chloride as the only phosphonium compound (a).

Suitably, the method comprises adding tri n-butyl n-tetradecyl phosphonium chloride (hereafter "TTPC") to the aqueous system. Suitably, the phosphonium compound (a) comprises TTPC. Suitably, the phosphonium compound (a) consists of TTPC.

Suitably, the method comprises adding an aqueous composition containing the phosphonium compound (a) to the aqueous system. Suitably, the method comprises adding an aqueous composition of TTPC to the aqueous system. The method may comprise adding an aqueous composition comprising 5% by weight of TTPC to the aqueous system. A suitable composition containing TTPC is available from BWA Water Additives and is sold under the trade name Bellacide 355 (an aqueous composition of TTPC and water consisting of water and 5% by weight of TTPC). The method may comprise adding an aqueous composition comprising 50% by weight of TTPC to the aqueous system. A suitable composition containing TTPC is available from BWA Water Additives and is sold under the trade name Bellacide 350 (an aqueous composition of TTPC and water consisting of water and 50% by weight of TTPC).

Suitably, the method comprises treating an aqueous system such that TTPC comprises greater than 50% of the total phosphonium compound(s) added to the aqueous system. Suitably, the method comprises treating an aqueous system such that TTPC comprises greater than 90% of the total phosphonium compound(s) added to the aqueous system, for example 99% or greater.

Suitably, the method comprises treating an aqueous system such that TTPC comprises greater than 50% of the total phosphonium compound(s) present in the aqueous system. Suitably, the method comprises treating an aqueous system such that TTPC comprises greater than 90% of the total phosphonium compound(s) present in the aqueous system, for example 99% or greater.

Suitably, the method employs TTPC as the only phosphonium compound (a).

The method may comprise adding a combination of halogen containing compounds (d) to an aqueous system. The method may comprise adding a combination of stabilised halogen containing compounds (e) to an aqueous system. The method may comprise adding a combination of halogen containing compounds (d) and stabilised halogen containing compounds (e) to an aqueous system. The method may comprise adding a combination of halogen containing compounds (d), stabilised halogen containing compounds (e) and stabiliser (c) to an aqueous system.

Suitably, the method employs a halogen containing compound (d) comprising a bromide. The halogen containing compound (d) may consist of a bromide. The method may employ a halogen containing compound (d) comprising sodium bromide. The halogen containing compound (d) may consist of a sodium bromide.

Suitably, the method employs a stabilised halogen containing compound (e) comprising bromosulfamate. The stabilised halogen containing compound (e) may consist of a bromosulfamate.

Suitably, the method comprises treating an aqueous system such that bromosulfamate comprises greater than 50% of the total compounds comprising halogen (including both compounds (d) and (e)) added to the aqueous system. Suitably, the method comprises treating an aqueous system such that bromosulfamate comprises greater than 90% of the total compounds comprising halogen (including both compounds (d) and (e)) added to the aqueous system, for example 99% or greater.

A suitable composition comprising bromosulfamate is BromMax 7.1 available from Enviro Tech Chemical Services, Inc.

The method may employ a synergistic mixture of compound (a) and composition (b). Suitably, by "synergistic mixture" it is meant that the mixture of compounds (a) and composition (b) has a synergistic effect on the inhibition of growth of one or more biological organisms, preferably micro-organisms such as bacteria, fungi and/or algae and/or has a synergistic effect on reducing the number of one or more biological organisms, preferably micro-organisms such as bacteria, fungi and/or algae.

The method may comprise adding compound (a) and composition (b) to the aqueous system such that the aqueous system comprises a synergistic mixture of compound (a) and composition (b).

The method may comprise adding compound (e) to the aqueous system. The method may comprise adding composition (b) comprising compound (e) to the aqueous system. Composition (b) may further comprise compound (d) and stabiliser (c) in addition to compound (e).

The method may comprise adding compounds (a) and (d) and (e) and stabiliser (c) as a mixture to the aqueous system. The method may comprise adding compound (a) to the aqueous system separately from compounds (d) and (e) and stabiliser (c) and allowing or causing them to mix within the aqueous system.

The method may comprise adding compound (a) and composition (b) as a mixture to the aqueous system. The method may comprise adding compound (a) and composition (b) separately to the aqueous system and allowing or causing them to mix within the aqueous system.

Where the method comprises mixing compound (a) and compounds (d)/(e) and adding the mixture to the aqueous system and/or adding compound (a) and compounds (d)/(e) separately to the aqueous system and allowing or causing them to mix within the aqueous system then compound (a) and compounds (d)/(e) are suitably used in the form of aqueous compositions.

Suitably, compound (a) is used in the form of an aqueous composition comprising between 1% and 90% by weight of compound (a), for example between 1% and 60% by weight. Suitably, compound (a) is used in the form of an aqueous composition comprising between 1% and 10% by weight of compound (a), for example 5% by weight.

Composition (b) may comprise an aqueous composition comprising compounds (d)/(e) in an amount of between 1% and 90% by weight of compounds (d)/(e), for example between 1% and 50% by weight of the composition. Suitably, compounds (d)/(e) are used in the form of an aqueous composition comprising between 1% and 10% by weight of compounds (d)/(e), for example 7% by weight.

Composition (b) may further comprise stabiliser (c) in an amount of between 1% and 90% by weight of the composition, for example between 1% and 30% by weight The method may comprise a method of treating an industrial water system. The method may comprise treating a cooling water system. The method may comprise treating a pulping and/or papermaking water system. The method may comprise treating an oil and/or gas field water system. The method may comprise treating an aqueous system to control the growth of bacterial and/or algal micro-organisms contained therein and/or which may become entrained in said system.

It has been found that the compositions and methods of utilisation of the present invention may in particular be efficacious in controlling acid producing facultative anaerobic bacteria and hydrogen sulphide producing anaerobic bacteria which may populate aqueous systems.

Surprisingly, it has been found that when compound (a) and composition (b) are combined the resulting combination may pose a higher degree of biocidal activity in an aqueous system than that of the individual compounds used alone. Because of the enhanced activity of the combination of treatment agent compounds, it may be possible for the total quantity of treatment agent added to an aqueous system to be reduced in comparison to a system using only one of said treatment agent compounds. In addition, the high degree of biocidal activity which is provided by each of the treatment agent compounds may be exploited without use of higher concentrations of each. The combination of TTPC and stabilised bromine may be particularly effective. The composition may also be surprisingly effective in systems having high total dissolved solids (TDS).

It has been found that the compositions and methods of utilisation of the present invention may in particular be efficacious in controlling the facultative anaerobic bacterium *Enterobacter aerogenes* and/or the anaerobic bacterium *Desulfovibrio vulgaris*, which may populate aqueous systems.

Surprisingly, the present inventor has found that mixtures of compound (a) and composition (b) such as mixtures of tri-n-butyl n-tetradecyl phosphonium chloride (TTPC) and bromosulfamate are especially efficacious in controlling the growth of micro-organisms such as bacterial and algal microbes in aqueous systems comprising dissolved solids. The efficacy in relation to acid and sulphide producing bacteria is marked with certain selections of amounts and ratios of components and there is an unexpected synergistic relationship. It has been found that compositions of compounds (a) and composition (b) are unexpectedly effective against anaerobes such as *Desulfovibrio vulgaris* It has been found that such compositions may have a marked synergy in relation to facultative anaerobes such as *Enterobacter aerogenes*

It has been found that compositions are unexpectedly effective against anaerobes. For example, stabilised chlorine may have some biocidal activity against anaerobes but the addition of TTPC may improve performance. It has been found that compositions are unexpectedly effective against facultative anaerobes. For example, stabilised bromine may have poor biocidal activity against facultative anaerobes except at high concentrations but the addition of TTPC may greatly improve performance and may essentially allow for complete kill at 24 hours.

According to a second aspect of the present invention there is provided a method of treating an aqueous system to inhibit growth of one or more micro-organisms therein and/or to reduce the number of live micro-organisms therein, wherein the method comprises adding treatment agents to said aqueous system and wherein said treatment agents comprise:

(i) tri n-butyl n-tetradecyl phosphonium chloride (TTPC); and (ii) bromosulfamate.

Suitably, the aqueous system comprises dissolved solids.

Suitably, the aqueous system comprises greater than 20,000 mg $l^{-1}$ total dissolved solids (TDS). The aqueous system may comprise greater than 50,000 mg $l^{-1}$ TDS, for example greater than 100,000 mg $l^{-1}$ TDS.

Suitably, the treatment agents comprise:

(i) tri n-butyl n-tetradecyl phosphonium chloride (TTPC); and (ii) a composition comprising bromosulfamate formed by oxidising sodium bromide with trichloroisocyanuric acid to give hypobromous acid and stabilising the hypobromous acid using sulfamic acid to yield bromosulfamate.

The treatment agents may comprise a composition (ii) comprising chlorosulfamate and sodium bromide. The composition (ii) may further comprise sulfamic acid. The composition (ii) may further comprise hypobromous acid.

The method of the second aspect may comprise any feature as described in relation to the first aspect except where such features are mutually exclusive.

According to a third aspect of the present invention there is provided a method of treating an aqueous system to inhibit growth of one or more micro-organisms therein and/or to reduce the number of live micro-organisms therein, wherein the method comprises adding treatment agents to said aqueous system and wherein said treatment agents comprise:

(i) tri n-butyl n-tetradecyl phosphonium chloride (TTPC); and (ii) stabilised sodium bromide.

Suitably, the aqueous system comprises dissolved solids.

Suitably, the aqueous system comprises greater than 20,000 mg $l^{-1}$ total dissolved solids (TDS). The aqueous system may comprise greater than 50,000 mg $l^{-1}$ TDS, for example greater than 100,000 mg $l^{-1}$ TDS Suitably, the treatment agents comprise:

(i) tri n-butyl n-tetradecyl phosphonium chloride (TTPC); and (ii) a composition comprising sodium bromide stabilised by reaction to form bromosulfamate.

The method of the third aspect may comprise any feature as described in relation to one or more of the first and/or second aspects except where such features are mutually exclusive.

According to a fourth aspect of the present invention there is provided an aqueous system incorporating a combination of:

(a) a phosphonium compound; and
(b) a stabilised halogen containing composition.

Suitably, the aqueous system comprises dissolved solids.

Suitably, the aqueous system comprises greater than 20,000 mg $l^{-1}$ total dissolved solids (TDS). The aqueous system may comprise greater than 50,000 mg $l^{-1}$ TDS, for example greater than 100,000 mg $l^{-1}$ TDS Suitably, said compound (a) comprises TTPC.

Said composition (b) may comprise a stabiliser (c) and a halogen containing compound (d). Alternatively, or in addition, said composition (b) may comprise a stabilised halogen containing compound (e).

Suitably, the stabilised halogen containing composition (b) comprises a bromine containing composition. The stabilised halogen containing composition (b) may comprise a bromide, for example sodium bromide. The stabilised halogen containing composition (b) may comprise sulfamate stabilised bromine. The stabilised halogen containing composition (b) may comprise bromosulfamate.

Suitably, the method comprises adding to an aqueous system a stabilised halogen containing composition (b) which comprises a composition formed from sodium bromide which has been oxidized by solid trichloroisocyanuric acid to give hypobromous acid with the hypobromous acid having been stabilised using sulfamic acid to provide bromosulfamate.

The aqueous system of the fourth aspect may comprise any feature as described in relation to one or more of the first and/or second and/or third aspects except where such features are mutually exclusive.

According to a fifth aspect of the present invention there is provided a method of inhibiting or preventing the growth of one or more micro-organisms in an aqueous media, wherein the method comprises adding treatment agents to an aqueous media comprising dissolved solids and wherein said treatment agents comprise:

(a) a phosphonium compound; and
(b) a stabilised halogen containing composition.

Suitably, the aqueous system comprises dissolved solids.

Suitably, the aqueous system comprises greater than 20,000 mg $l^{-1}$ total dissolved solids (TDS). The aqueous system may comprise greater than 50,000 mg $l^{-1}$ TDS, for example greater than 100,000 mg $l^{-1}$ TDS Suitably, said compound (a) comprises TTPC.

Said composition (b) may comprise a stabiliser (c) and a halogen containing compound (d). Alternatively, or in addition, said composition (b) may comprise a stabilised halogen containing compound (e).

Suitably, the stabilised halogen containing composition (b) comprises a bromine containing composition. The stabilised halogen containing composition (b) may comprise a bromide, for example sodium bromide. The stabilised halogen containing composition (b) may comprise sulfamate stabilised bromine. The stabilised halogen containing composition (b) may comprise bromosulfamate.

Suitably, the method comprises adding to an aqueous system a stabilised halogen containing composition (b) which comprises a composition formed from sodium bromide which has been oxidized by solid trichloroisocyanuric acid to give hypobromous acid with the hypobromous acid having been stabilised using sulfamic acid to provide bromosulfamate.

The method of the fifth aspect may comprise any feature as described in relation to one or more of the first and/or second and/or third and/or fourth aspects except where such features are mutually exclusive.

According to a sixth aspect of the present invention there is provided an aqueous media comprising dissolved solids and incorporating a combination of:

(a) a phosphonium compound; and
(b) a stabilised halogen containing composition.

Suitably, the aqueous system comprises dissolved solids.

Suitably, the aqueous system comprises greater than 20,000 mg $l^{-1}$ total dissolved solids (TDS). The aqueous system may comprise greater than 50,000 mg $l^{-1}$ TDS, for example greater than 100,000 mg $l^{-1}$ TDS Suitably, said compound (a) comprises TTPC.

Said composition (b) may comprise a stabiliser (c) and a halogen containing compound (d). Alternatively, or in addition, said composition (b) may comprise a stabilised halogen containing compound (e).

Suitably, the stabilised halogen containing composition (b) comprises a bromine containing composition. The stabilised halogen containing composition (b) may comprise a bromide, for example sodium bromide. The stabilised halogen containing composition (b) may comprise sulfamate stabilised bromine. The stabilised halogen containing composition (b) may comprise bromosulfamate.

Suitably, the method comprises adding to an aqueous system a stabilised halogen containing composition (b) which comprises a composition formed from sodium bromide which has been oxidized by solid trichloroisocyanuric acid to give hypobromous acid with the hypobromous acid having been stabilised using sulfamic acid to provide bromosulfamate.

The aqueous media of the sixth aspect may comprise any feature as described in relation to one or more of the first and/or second and/or third and/or fourth and/or fifth aspects except where such features are mutually exclusive.

According to a seventh aspect of the present invention there is provided a biocidal composition comprising a combination of:

(a) a phosphonium compound; and
(b) a stabilised halogen containing composition.

Suitably, said compound (a) comprises TTPC.

Said composition (b) may comprise a stabiliser (c) and a halogen containing compound (d). Alternatively, or in addition, said composition (b) may comprise a stabilised halogen containing compound (e).

Suitably, the stabilised halogen containing composition (b) comprises a bromine containing composition. The stabilised halogen containing composition (b) may comprise a bromide, for example sodium bromide. The stabilised halogen containing composition (b) may comprise sulfamate stabilised bromine. The stabilised halogen containing composition (b) may comprise bromosulfamate.

Suitably, the method comprises adding to an aqueous system a stabilised halogen containing composition (b) which comprises a composition formed from sodium bromide which has been oxidized by solid trichloroisocyanuric acid to give hypobromous acid with the hypobromous acid having been stabilised using sulfamic acid to provide bromosulfamate.

The biocidal composition of the seventh aspect may comprise any feature as described in relation to one or more of the first and/or second and/or third and/or fourth and/or fifth and/or sixth aspects except where such features are mutually exclusive.

DETAILED DESCRIPTION OF PREFERRED EMBODIMENTS

The present invention will now be illustrated by way of example with reference to the following preferred embodiments.

EXAMPLES

Aqueous systems were treated by adding treatment agents comprising: (a) a phosphonium compound and (b) a stabilised halogen containing composition. The phosphonium compound (a) used was TTPC. The stabilised halogen containing composition (b) was a stabilised bromine composition which comprised sodium bromide stabilised to give bromosulfamate.

A suspension of *Desulfovibrio vulgaris* plus *Enterobacter aerogenes* bacteria containing from $1\times10^6$ to $1\times10^8$ cells/mL was prepared in sterile pH 8 phosphate buffer containing varying levels of sodium chloride to give the desired total dissolved solids (TDS) concentration. Aliquots of this suspension were dosed with the indicated concentrations of the phosphonium compound (a) and stabilised halogen containing composition (b) with the concentrations being measured as ppm by weight of the stated composition in the dosed suspension. The mixtures were allowed to stand at room temperature. At the designated contact times, each mixture was sampled to determine the total number of viable cells of both *Desulfovibrio vulgaris* and *Enterobacter aerogenes* by serial 10-fold dilution into API RP 38 media vials and anaerobic acid producing media vials, respectively. The vials were incubated at 37° C. for 72 hours. Results were recorded as cells per millilitre.

Aqueous media inoculated with anaerobe and aerobe culture and having a TDS of 30,000 mg $l^{-1}$ was treated with treatment agents comprising: (i) stabilised halogen containing composition; (ii) tri n-butyl n-tetradecyl phosphonium chloride (TTPC) or (iii) a combination of stabilised halogen containing composition and TTPC.

TTPC was used in the form of Bellacide 350, an aqueous composition of TTPC and water consisting of water and 50% by weight of TTPC.

The stabilised halogen containing composition comprised sodium bromide stabilised to give bromosulfamate and the composition used was Bromax 7.1 available from Enviro Tech Chemical Services, Inc. This composition comprises bromosulfamate produced by oxidising sodium bromide with trichloroisocyanuric acid to give hypobromous acid and stabilising the hypobromous acid using sulfamic acid to yield bromosulfamate. The activity of the composition is approximately 7.1% as chlorine.

The efficacy of the treatment agents was evaluated by measuring the Log 10 Reduction of the anaerobic bacterium *Desulfovibrio vulgaris* and the facultative anaerobeic bacterium *Enterobacter aerogenes* after contact times of 1 hour, 4 hours and 24 hours as detailed in Table 1. For TTPC the stated ppm value relates to the amount of TTPC added (active). For the stabilised bromine composition the stated ppm relates to the amount of Bromax 7.1 added (product)

TABLE 1

| Example | TDS (mg $l^{-1}$) | Contact time (hours) | Treatment agent (ppm) TTPC (as active) | Stabilized bromine composition (as product) | Log10 Reduction Anaerobes | Log10 Reduction Facultative Anaerobes |
|---|---|---|---|---|---|---|
| 1 (comparative) | 30,000 | 1 | 6.25 | — | 3 | 1 |
| 2 (comparative) | 30,000 | 1 | 12.5 | — | 6 | 4 |
| 3 (comparative) | 30,000 | 1 | — | 105 | 4 | 1 |
| 4 (comparative) | 30,000 | 1 | — | 210 | 5 | 5 |
| 5 (comparative) | 30,000 | 1 | — | 315 | 6 | 8 |
| 6 | 30,000 | 1 | 3.125 | 105 | 6 | 1 |
| 7 | 30,000 | 1 | 6.25 | 105 | 6 | 1 |
| 8 | 30,000 | 1 | 12.5 | 105 | 6 | 5 |
| 9 (comparative) | 30,000 | 4 | 6.25 | — | 6 | 5 |
| 10 (comparative) | 30,000 | 4 | 12.5 | — | 6 | 5 |
| 11 (comparative) | 30,000 | 4 | — | 105 | 5 | 1 |
| 12 (comparative) | 30,000 | 4 | — | 210 | 6 | 5 |
| 13 (comparative) | 30,000 | 4 | — | 315 | 6 | 8 |
| 14 | 30,000 | 4 | 3.125 | 105 | 6 | 5 |
| 15 | 30,000 | 4 | 6.25 | 105 | 6 | 7 |
| 16 | 30,000 | 4 | 12.5 | 105 | 6 | 8 |
| 17 (comparative) | 30,000 | 24 | 6.25 | — | 6 | 5 |
| 18 (comparative) | 30,000 | 24 | 12.5 | — | 6 | 8 |
| 19 (comparative) | 30,000 | 24 | — | 105 | 6 | 2 |
| 20 (comparative) | 30,000 | 24 | — | 210 | 6 | 5 |
| 21 (comparative) | 30,000 | 24 | — | 315 | 6 | 8 |
| 22 | 30,000 | 24 | 3.125 | 105 | 6 | 8 |
| 23 | 30,000 | 24 | 6.25 | 105 | 6 | 8 |
| 24 | 30,000 | 24 | 12.5 | 105 | 6 | 8 |

A Log 10 reduction of 6 represents a complete kill for anaerobes and a Log 10 reduction of 8 represents a complete kill for facultative anaerobes.

It can be seen from the Examples that with a TDS of 30,000 mg $l^{-1}$ stabilised bromine shows some biocidal activity against anaerobes but the addition of TTPC surprisingly improved the performance with a 1 hour contact time. It can also be seen that although stabilised bromine has poor biocidal activity against facultative anaerobes the addition of TTPC greatly improves performance essentially providing complete kill at 24 hours.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method comprising:
adding treatment agents to an aqueous system, the aqueous system comprising one or more salts, having a total dissolved solids (TDS) of 20,000 mg $l^{-1}$ or greater, and containing *Desulfovibrio vulgaris* and *Enterobacter aerogenes*, the treatment agents comprising a combination of:
   (a) tri n-butyl n-tetradecyl phosphonium chloride (TTPC); and
   (b) a stabilised halogen containing composition which comprises bromosulfamate;
wherein the combination of TTPC and stabilized halogen containing composition are added to the aqueous system in amounts configured to reduce the number of live *Desulfovibrio vulgaris* and *Enterobacter aerogenes* in the aqueous system;
wherein said TTPC and said stabilized halogen containing composition are at a weight ratio of from 1.0:0.5 to 1.0:100.0;
wherein said TTPC is added to said aqueous system in an amount of up to 70 parts by weight per one million parts by weight of said aqueous system (ppm); and
wherein said TTPC and said bromosulfamate are added to the aqueous system in a total amount of from 0.1 to 1000 ppm.

2. A method according to claim 1, wherein the stabilised halogen containing composition (b) comprises a composition formed from an oxidizing bromine source or sodium bromide which has been oxidized by an oxidizing chlorine source, to give hypobromous acid with the hypobromous acid having been stabilised using sulfamic acid to provide bromosulfamate.

3. A method according to claim 1, wherein the stabilised halogen containing composition (b) comprises a stabiliser (c) and a halogen containing compound (d).

4. A method according to claim 3, wherein the halogen containing compound (d) comprises sodium bromide and wherein the stabiliser (c) comprises sulfamic acid.

5. A method according to claim 1, wherein the method comprises treating said aqueous system such that a Log 10 reduction of 7 or greater in a facultative anaerobe culture is obtained after a contact time of 24 hours.

6. A method according to claim 1, wherein the method comprises treating an aqueous system having a TDS of 30,000 mg $l^{-1}$ or greater.

7. A method according to claim 1, wherein the method comprises adding said TTPC to said aqueous system in an amount of at least 0.1 ppm and not more than 25 ppm.

8. A method according to claim 3, wherein the method comprises adding the composition (b) to provide a treated aqueous system comprising hypobromous acid in an amount of at least 0.1 ppm.

9. A method according to claim 1, wherein the method comprises adding stabilised halogen containing composition (b) to said aqueous system in an amount of at least 10 ppm.

10. The method of claim 1, wherein:
the aqueous system is an aqueous media, the aqueous media having a TDS of 30,000 mg $l^{-1}$ or greater;
the combination of TTPC and stabilised halogen containing composition are added to the aqueous media in amounts configured to inhibit the growth of *Desulfovibrio vulgaris* and *Enterobacter aerogenes* in the aqueous media; and
said TTPC and said stabilized halogen containing composition are at a weight ratio of from 1.0:5.0 to 1.0:50.0.

11. A method according to claim 1, wherein the method comprises adding the composition (b) to provide a treated aqueous system comprising bromosulfamate in an amount of at least 0.1 ppm.

12. A method according to claim 1, wherein the aqueous system contains oil.

13. A method according to claim 1, wherein the method comprises treating said aqueous system such that a Log 10 reduction of 6 or greater in anaerobe culture is obtained after a contact time of 1 hour.

14. A method according to claim 2, wherein the stabilised halogen containing composition (b) comprises a bromine containing composition formed from sodium bromide which has been oxidized by solid trichloroisocyanuric acid to give hypobromous acid with the hypobromous acid having been stabilised using sulfamic acid to provide bromosulfamate.

15. A method according to claim 1, wherein said weight ratio is from 1.0:5.0 to 1.0:50.0.

16. A method comprising:
adding treatment agents to an aqueous system, the aqueous system comprising one or more salts, having a total dissolved solids (TDS) of 30,000 mg $l^{-1}$ or greater, and containing *Desulfovibrio vulgaris* and *Enterobacter aerogenes*, the treatment agents comprising a combination of:
   (i) tri n-butyl n-tetradecyl phosphonium chloride (TTPC); and
   (ii) bromosulfamate;
wherein the combination of TTPC and bromosulfamate are added to the aqueous system in amounts configured to reduce the number of live *Desulfovibrio vulgaris* and *Enterobacter aerogenes* in the aqueous system; and
wherein said TTPC and said bromosulfamate are at a weight ratio of from 1.0:5.0 to 1.0:50.0.

17. A method according to claim 16, wherein the method comprises adding TTPC to said aqueous system in an amount of at least 0.1 ppm and adding said bromosulfamate to said aqueous system in an amount of at least 0.1 ppm.

18. A method according to claim 16, wherein the method comprises treating an aqueous system such that a Log 10 reduction of 7 or greater in a facultative anaerobe culture is obtained after a contact time of 24 hours.

19. A method according to claim 16, wherein the amount of TTPC is from 1.0 to 20 parts by weight per one million parts by weight of said aqueous system (ppm) and the amount of bromosulfamate is from 10 ppm to 500 ppm.

20. A method according to claim 16, wherein the amount of TTPC is less than 12.5 parts by weight per one million parts by weight of said aqueous system (ppm) and the amount of bromosulfamate is less than 315 ppm.

21. A method according to claim 20, wherein the combination of TTPC and bromosulfamate are added to the aqueous system in amounts configured to reduce the number of live *Desulfovibrio vulgaris* and *Enterobacter aerogenes* in the aqueous system by a Log 10 reduction of 6 or greater within 24 hours of the adding.

22. A method according to claim 20, wherein the combination of TTPC and bromosulfamate are added to the aqueous system in amounts configured to provide a complete kill of *Desulfovibrio vulgaris* and *Enterobacter aerogenes* in the aqueous system within 24 hours of the adding.

23. A method comprising:
   adding treatment agents to an aqueous system, the aqueous system comprising one or more salts, having a total dissolved solids (TDS) of 30,000 mg l$^{-1}$ or greater, and containing *Desulfovibrio vulgaris* and *Enterobacter aerogenes*, the treatment agents comprising a combination of:
   (i) tri n-butyl n-tetradecyl phosphonium chloride (TTPC); and
   (ii) stabilised halogen containing composition which comprises stabilised hypobromous acid;
   wherein the combination of TTPC and stabilised halogen containing composition are added to the aqueous system in amounts configured to reduce the number of live *Desulfovibrio* vulgaris and *Enterobacter aerogenes* in the aqueous system by a Log 10 reduction of 6 or greater within 24 hours of the adding;
   wherein said TTPC is added to said aqueous system in an amount of up to 70 parts by weight per one million parts by weight of said aqueous system (ppm); and
   wherein said TTPC and said stabilized hypobromous acid are added to said aqueous system in a total amount of from 0.1 ppm to 1000 ppm.

24. A method according to claim 23, wherein the method comprises adding said TTPC and said stabilised halogen containing composition to said aqueous system in a weight ratio of TTPC:stabilised halogen containing composition of from 1.0:5.0 to 1.0:50.0 and adding said TTPC in an amount of not more than 50 ppm.

25. A method according to claim 23, wherein the method further comprises inhibiting the growth of *Desulfovibrio vulgaris* and *Enterobacter aerogenes*.

26. A method according to claim 23, wherein the method further comprises inhibiting the growth of *Desulfovibrio vulgaris* and *Enterobacter aerogenes* and comprises adding said TTPC and said stabilised halogen containing composition to said aqueous system in a weight ratio respectively, of TTPC:stabilised halogen containing composition of from 1.0:5.0 to 1.0:50.0.

* * * * *